United States Patent
Alfano et al.

(10) Patent No.: US 11,567,234 B2
(45) Date of Patent: Jan. 31, 2023

(54) METHOD FOR ALTERING LIGHT INTERACTIONS WITH COMPLEX STRUCTURED LIGHT

(71) Applicant: Research Foundation of the City University of New York, New York, NY (US)

(72) Inventors: Robert R. Alfano, Bronx, NY (US); Daniel Nolan, Painted Post, NY (US)

(73) Assignee: Research Foundation of the City University of New York, New York, NY (US)

( * ) Notice: Subject to any disclaimer, the term of this patent is extended or adjusted under 35 U.S.C. 154(b) by 741 days.

(21) Appl. No.: 16/433,764

(22) Filed: Jun. 6, 2019

(65) Prior Publication Data

US 2019/0324171 A1 Oct. 24, 2019

Related U.S. Application Data

(62) Division of application No. 15/218,602, filed on Jul. 25, 2016, now abandoned.

(Continued)

(51) Int. Cl.
*G02B 1/00* (2006.01)
*G02B 6/28* (2006.01)

(52) U.S. Cl.
CPC ........... *G02B 1/002* (2013.01); *G02B 6/2861* (2013.01)

(58) Field of Classification Search
CPC ............................. G02B 1/002; G02B 6/2861
See application file for complete search history.

(56) References Cited

U.S. PATENT DOCUMENTS 6,580,540 B1 * 6/2003 Palese .................. G02F 1/0338
398/43
7,680,361 B2 3/2010 Okayama
(Continued)

FOREIGN PATENT DOCUMENTS

WO WO2016090153 6/2016

OTHER PUBLICATIONS

Alfano, R. et al.; Slowing of Bessel light beam group velocity; Optics Communications; Oct. 23, 2015; pp. 25-27; vol. 361; Elsevier B.V.

(Continued)

*Primary Examiner* — James C. Jones
(74) *Attorney, Agent, or Firm* — Peter J. Mikesell; Schmeiser, Olsen & Watts, LLP

(57) ABSTRACT

Structured beams, Bessel beams, Laguerre Gaussian beams, and focused Gaussian are used as a natural waveguide and its group velocity can be subluminal (slower than the speed of light) as compared to a Gaussian beam in free space. A free space dispersion relation for a Bessel beam, i.e., the dependence of its wavenumber on its angular frequency, is outlined from which the Bessel beam's subluminal group velocity is derived. For reasonable conditions a Bessel light beam has associated parameters that allow slowing near a critical frequency. The application of Bessel beams for a natural optical buffer in free space is presented. Optical transitions and selection rules in materials are altered by structured light carrying orbital angular momentum (OAM). Nano antennas are used to enhance the interactions of structured light.

14 Claims, 4 Drawing Sheets

Related U.S. Application Data

(60) Provisional application No. 62/282,021, filed on Jul. 23, 2015.

(56) References Cited

U.S. PATENT DOCUMENTS 8,711,211 B2    4/2014  Betzig
9,341,782 B2    5/2016  Liu et al.

OTHER PUBLICATIONS

Giovannini, D et al.; Spatially Structured Photons that Travel in Free Space Slower than the Speed of Light; Enlighten; 2015; pp. 857-860; 347(6224); Copyright © 2015 The Authors.

Bareza, N., et al; Subluminal group velocity and dispersion of Laguerre Gauss beams in free space; Scientific Reports; 5/27/206; pp. 1-6; 6:26842 | DOI: 10.1038/srep26842; Nature.

Matsko, A., et al.; Whispering Gallery Mode Spool as an Optical Buffer; Optical Society of America; 2006; pp. 1-3.

Bharadwaj, P. et al.; Optical Antennas; Advances in Optics and Photonics; Aug. 11, 2009; pp. 438-483; Doc. ID 108726); Optical Society of America.

Yu, Z., et al.; Fundamental limit of light trapping in grating structures; Optics Express; Sep. 13, 2010; pp. 17491-17496; vol. 18, No. S3; Optical Society of America.

Vasilyeu, R. et al.; Generating superpositions of higher-order Bessel beams; Optics Express; Dec. 21, 2009; pp. 23389-23395; vol. 17, No. 26; Optical Society of America.

Yessenov, M. et al.; What is the maximum differential group delay achievable by a space-time wave packet in free space?; Optics Express; Apr. 29, 2019; pp. 12443-12457; vol. 27, Issue 9; https://doi.org/10.1364/OE.27.012443.

\* cited by examiner

METHOD FOR ALTERING LIGHT INTERACTIONS WITH COMPLEX STRUCTURED LIGHT

CROSS-REFERENCE TO RELATED APPLICATIONS

This application claims priority to and is a divisional of U.S. patent application Ser. No. 15/218,602 (filed Jul. 25, 2016) which is a non-provisional of U.S. Patent Application 62/282,021 (filed Jul. 23, 2015), the entirety of which is incorporated herein by reference.

STATEMENT OF FEDERALLY SPONSORED RESEARCH OR DEVELOPMENT

This invention was made with Government support under grant number W911NF-13-1-0151 awarded by the Army Research Office. The government has certain rights in the invention.

BACKGROUND OF THE INVENTION

The subject matter disclosed herein relates to methods of using Structure Complex light from Special Functions, such as Bessel (B), Laguerre Gaussian (LG), and Gaussian (G), which satisfies Maxwell linear and nonlinear Polarization Wave equation for slowing light. In certain embodiments, the subject matter relates to an optical buffer that slows light and to a special small antenna to enhance the interactions and transitions in materials using the Special functions.

Light's salient degrees of freedom are the independent parameters that completely describe an electromagnetic wave (in the paraxial approximation) and include polarization, wavelength, and time. Light's space degree of freedom has received significant attention via the sub-discipline of optics that can be referred to as complex light or structured light. The study of complex light is a veritable renaissance of optics; using light's space degree of freedom many classical optics phenomena have been revisited with novel results, such as double slit diffraction, the mechanical Faraday effect, and Fermat's principle. Additionally, using light's space degree of freedom the fundamental limits of many optics applications have been addressed, e.g., the transmission data rate of optical fiber communication can potentially be increased beyond that single mode optical fibers via space division multiplexing, and it is possible to image below the diffraction limit via Stimulated Emission Depletion (STED) microscopy.

There are several ways to slow light to store in a buffer: as optical fiber, grating, resonator cavity, and etalons. There are few new approaches, including electromagnetic induced transparency (EIT) and coupled resonator (CR). EIT slowing has been observed in metal vapor with large $v_g$=10 m/s. CR delays light on the same time scale. It would be desirable to provide new methods of slowing light.

The discussion above is merely provided for general background information and is not intended to be used as an aid in determining the scope of the claimed subject matter.

BRIEF DESCRIPTION OF THE INVENTION

Structured beams, Bessel beams, Laguerre Gaussian beams, and focused Gaussian are used as a natural waveguide and its group velocity can be subluminal (slower than the speed of light) as compared to a Gaussian beam in free space. A free space dispersion relation for a Bessel beam, i.e., the dependence of its wavenumber on its angular frequency, is outlined from which the Bessel beam's subluminal group velocity is derived. For reasonable conditions a Bessel light beam has associated parameters that allow slowing near a critical frequency. The application of Bessel beams for a natural optical buffer in free space is presented. Optical transitions and selection rules in materials are altered by structured light carrying orbital angular momentum (OAM). Nano antennas are used to enhance the interactions of structured light. An advantage that may be realized in the practice of some disclosed embodiments of the method is that it provides an alternative method to produce subluminal light.

This disclosure provides a method of altering light-matter interactions through the use of structured light beams and structured materials. The method is useful in applications to enhance products such as optical buffers, solar cells, photodetectors, and lasers and enhance processes such as quantum effects and entanglement.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION OF THE INVENTION

Figure 1:
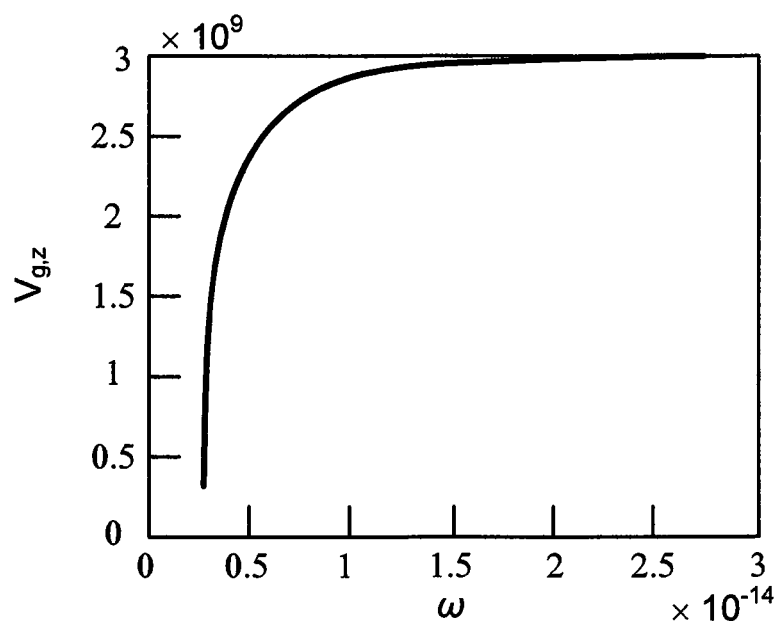
FIG. 1 is a graph depicting group velocity of a Bessel light beam as a function of angular frequency.

Light propagates in well-defined so-called available modes or density of states in air and material medium. The modes can be controlled by alteration of the material's structure into antennas, cavities, and waveguides. This, in turn, alters the available and resonant modes and available states of light within the material resulting in many novel phenomena and light-material interactions such as subluminal light propagation (slow light), enhanced light emission and absorption, reduced reflection, alteration of energy pathways, and non-radiative as well as radiative processes. The underlying mechanism responsible for this is a change in the available modes within the medium due to the specific structure of the material.

A Bessel light beam is an example of a nonplanar light beam described by a special function. A Bessel beam is a light beam that, in contrast to more conventional Gaussian beams, possesses noteworthy properties, such as, "self-healing" and diffraction-limited propagation associated with a pencil-like beam profile. Due to these properties, Bessel beams have been extensively studied and used for a number of applications. When using a Bessel beam for optical trapping it is possible to simultaneously trap multiple particles in well-separated planes, and make a particle tractor beam. Also, when using a Bessel beam's line profile for light sheet microscopy it is possible to rapidly image biological samples (e.g. tissue) in three-dimensions.

The wave equation in cylindrical coordinates is:

$$(\nabla^2(r,\varphi,z)-k^2)\varphi(r,\varphi,z)=0 \quad (1)$$

where (r, φ, z) are cylindrical coordinates, $$k = \frac{2\pi}{\lambda}$$

is the wavenumber, λ is light's wavelength.

As a solution to the wave equation, a Bessel beam is derived via separation of variables where φ(r, φ, z)=R(r)Φ(Φ)Z(z):

$$\varphi(r,\varphi,z)=J_0(k_\perp r)\exp(ik_z z)\exp(-i\omega t) \quad (2)$$

where $k_\perp$ and $k_z$ are the transverse and axial propagation wavenumbers, respectively.

The relationship between the transverse ($k_\perp$) and axial wave ($k_z$) numbers is:

$$k_z^2(\omega)+k_\perp^2=k^2(\omega) \quad (3)$$

The propagation constant k(ω) of the beam is given by dispersion relationship:

$$k(\omega) = \frac{\omega n(\omega)}{c} \quad (4)$$

where n(ω) is the index of refraction of the medium in which the Bessel light beam propagates, c is the speed of the light and ω is the light's angular frequency.

By combining the above equations, the relationship between the transverse ($k_\perp$) and axial wave ($k_z$) numbers can be rewritten as:

$$\omega^2(k_z) = \frac{c^2}{n^2}k_z^2 + \frac{c^2}{n^2}k_\perp^2 \quad (5)$$

$$\omega(k_z) = \left(\frac{c^2}{n^2}k_z^2 + \frac{c^2}{n^2}k_\perp^2\right)^{1/2} \text{ and} \quad (6)$$

$$\omega(k_z) = \left(\frac{c^2}{n^2}k_z^2 + \omega_c^2\right)^{1/2} \quad (7)$$

The critical frequency ($\omega_c$) is defined as:

$$\omega_c \equiv \frac{ck_\perp}{n} \quad (8)$$

which represents the frequency of the number of standing waves in perpendicular transverse direction. In one embodiment, the angular frequency (ω) is within 25% of the critical frequency ($\omega_c$). In another embodiment, the angular frequency (ω) is within 10% of the critical frequency ($\omega_c$). In another embodiment, the angular frequency (ω) is within 5% of the critical frequency ($\omega_c$).

Equation 7 embodies a free space dispersion relationship ω vs k for a Bessel light beam in free space (i.e. the dependence of its angular frequency on its axial wave vector).

The group velocity of a Bessel light beam can then be derived from this dispersion relation via the definition of group velocity:

$$v_{g,z} = \frac{\partial \omega(k_z)}{\partial k_z} \quad (9)$$

Subsequently, $v_g$ becomes $$v_{g,z} = \frac{1}{2}\frac{c^2}{n^2}2k_z\left(\frac{c^2}{n^2}k_z^2 + \omega_c^2\right)^{-\frac{1}{2}} \text{ and} \quad (10)$$

$$v_{g,z} = \frac{\frac{c^2}{n^2}k_z}{\left(\frac{c^2}{n^2}k_z^2 + \omega_c^2\right)^{\frac{1}{2}}} \quad (11)$$

Using equation 3, equation 11 can be rewritten as:

$$v_{g,z} = \frac{\frac{c^2}{n^2}(k^2 - k_\perp^2)}{\left(\frac{c^2}{n^2}k^2 + \frac{c^2}{n^2}k_\perp^2 + \omega_c^2\right)^{\frac{1}{2}}} \quad (12)$$

Using equation 8, equation 12 can be rewritten as:

$$v_{g,z} = \frac{\frac{c^2}{n^2}(k^2 - k_\perp^2)^{\frac{1}{2}}}{(k^2)^{\frac{1}{2}}} \quad (13)$$

Using equation 4, and again 8, equation 13 can be written for $v_{g,z}$ as:

$$v_{g,z} = \frac{c}{n}\left[1 - \left(\frac{\omega_c}{\omega}\right)^2\right]^{\frac{1}{2}} \quad (14)$$

From equation 14, when ω approaches the critical frequency $\omega_c$, then $v_{g,z}=0$ and the Bessel beam stops. See FIG. 1 where a graph of $v_{g,z}$ vs w is shown. For $\omega=\omega_c$, the beam is frozen.

The critical frequency $\omega_c$ is defined via the transverse wavenumber and diameter of the Bessel light beam to form a set of standing waves:

$$k_\perp = \frac{2\pi}{a} \quad (15)$$

where a is the beam diameter of the central lope Bessel light beam. In one embodiment, the diameter is between 0.1 μm and 10 μm. Consider a Bessel light beam with a beam diameter of a=0.63 μm propagating in air (n=1). The corresponding transverse wavenumber is given by $k_\perp \approx 10$ μm$^{-1}$. Then the Bessel light beam's critical frequency corresponds to a wavelength $\lambda_c=632$ nm (red light).

An effective group index of refraction $n_g$ can also be defined from equation 14:

$$n_g = \frac{c}{v_{g,z}} \text{ and} \quad (16)$$

$$n_g = n\left[1 - \left(\frac{\omega_c}{\omega}\right)^2\right]^{-\frac{1}{2}} \quad (17)$$

Figure 2:
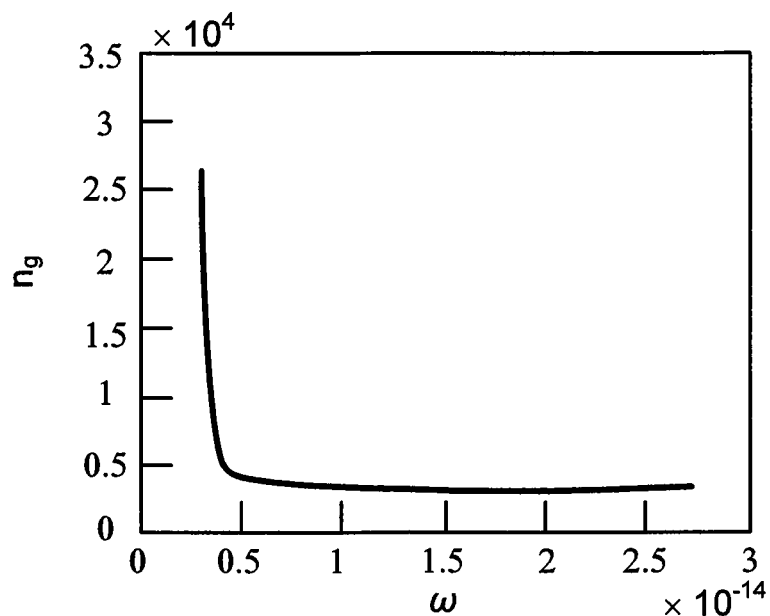
FIG. 2 is a graph depicting group index of a Bessel light beam as a function of angular frequency.

A plot of the group index $n_g$ (equation 17) for the same example shown in FIG. 2. The group index $n_g$ becomes large as $\omega \to \omega_c$; at $\omega=\omega_c, n_g \to \infty$.

The natural slowing of a Bessel light beam in free space can be used as a free space delay line or an optical buffer. As examples, consider Bessel light beams whose wavelengths are given by $\lambda \approx 632$ nm and $\lambda \approx 800$ nm.

The parameters for $\lambda \approx 632$ nm become $k_\perp=2\pi/a$, $a(\lambda) \approx 0.63$ μm and $k_\perp=10$ μm$^{-1}$ for n=1 (air) such that $$\omega_c = k_\perp \frac{c}{n} = 3 fs^{-1}.$$

The laser $\lambda \approx 632$ nm, $\omega_L \approx 2.98$ fs$^{-1}$, slowing will occur; where $\omega=2\pi\nu$ and $c=\lambda\nu$.

The parameters for $\lambda \approx 800$ nm become $k_\perp=2\pi/a$, $a(\lambda) \approx 1$ μm and $k_\perp=6.3$ μm$^{-1}$ for n=1 (air) such that $$\omega_c = k_\perp \frac{c}{n} = 2.4 fs^{-1}.$$

The laser $\lambda \approx 800$ nm, $\omega_L \approx 2.4$ fs$^{-1}$, slowing will occur. In other embodiments, the medium is a fiber optic cable.

Consider the time it takes that Bessel light beam propagate over a distance l given by $t=l/v_g$ as compared to a Gaussian light beam propagating over the same distance using an axicon lens or SLM over beam length of l=1 cm and beam waist of a≈1 μm. For $n_g$~3 the time delay is given y 100 ps to 200 ps. Otherwise the delay will be on order of 100 fs scale.

Figure 4:
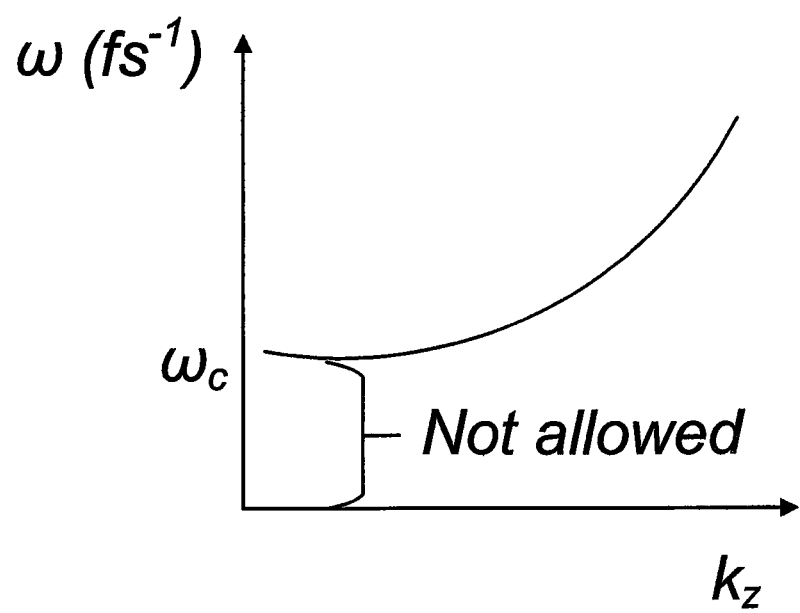
FIG. 4 is a graph depicting a Bessel band gap.

As mentioned above, the Bessel light is a "natural time delay line" for slowing light in n from the diffraction induced energy gap $\omega_c$ arising from the transverse $k_\perp$ component. See FIG. 4. Depending on $\omega_c$ relative to ω, $n_g$ can be changed from, i.e., $n_g$=5 to 1000. As $\omega \to \omega_c$, the group velocity becomes subliminal, slowing down $v_g \to 0$.

Additional Embodiments

From Fermi's Golden rule the transition probability is governed by the transition matrix under the interaction Hamiltonian that includes the inner product $\vec{A} \cdot \vec{\rho}$ of the incident light's vector potential $\vec{A}$ and the material's momentum operator $$\vec{\rho}\left(\vec{\rho} = \frac{\hbar}{i}\nabla\right)$$

between an initial |i⟩ and final |f⟩ material states, respectively and is proportional to the material's density of states ρ(ω). The vector potential $\vec{A}$ is not restricted to conventional plane wave front light beams, such as the fundamental TEM$_{00}$ Gaussian (G) laser mode, but also higher order Laguerre-Gaussian (LG), Bessel (B) and Bessel-Gaussian nonplanar front solutions to the wave equation with a characteristic helical twisted nonplanar wave front instead of plane wave front called an optical vortex. This additional properly allows light to carry a well-defined and higher dimensional orbital angular momentum (OAM) and the possibility of changing the selection rules governing the dipole transition from states |i⟩ to |f⟩.

Electromagnetic waves with a vector potential $\vec{A}$ can occupy a number of modes within a volume of space V in a range of frequencies. There are a finite number of states allowed by the dispersion curves and the corresponding density of states ρ(ω). In free space the plane waves fit into space that are normal modes within a cube of length L. The number of wavelengths that fit in the cube's length are L/2, 2L/2, ..., nL/2. This gives the density of modes of the electromagnetic waves referred to as the photon's density of states in free space per volume:

$$\rho(\omega) = \frac{\omega^2}{\pi^2 c^3} \quad (18)$$

where ω is the light's angular frequency and c is the speed of light.

The spontaneous rate (A coefficient) from Einstein is:

$$A = \left(\frac{8\pi\nu^2}{c^3}\right) h\nu\left(\frac{8\pi\rho^2}{3h^2}\right)[s^{-1}] \quad (19)$$

where ρ is the dipole moment. The density of states is:

$$\rho(\nu) = \frac{8\pi\nu^2}{c^3} \text{ number of states per } V \text{ and frequency} \quad (20)$$

For a resonant cavity of volume V the $Q=v_0/\Delta v$ and the spontaneous rate is changed by the Purcell factor $F_p$ given by:

$$F_p = \frac{3Q\lambda^3}{4\pi^2 V} \quad (21)$$

For a dipole in a small volume $V=(1~\mu m)^3$, $\lambda=1~\mu m$, and $Q=100$, $F_p$ is:

$$F_p=75 \quad (22)$$

If $\lambda=\frac{1}{2}~\mu m$, the enhancement F is 8×, even if Q=1 due to confinement. The emission is stronger by $F_p$. In one embodiment, the volume is less than 5 $\mu m^3$. In another embodiment, the volume is between 0.5 and 3 $\mu m^3$. Note, density of photon states:

$$\rho(v) = \frac{8\pi v^2}{\hbar c^3} [cm^{-3} eV] \text{ per } V \text{ per energy} \quad (23)$$

Note, density of photon states:

$$\rho(hv) = \frac{8\pi v^2}{hc^3} [cm^{-3}] \text{ per } V \text{ per energy} \quad (24)$$

The dispersion curve $\omega$ vs. k or $n(\omega)$ vs. $\omega$ of quasi particles (e.g. photons, plasmons, phonons, excitons, polaritons) travel with velocity determined by $\omega$ vs. k via $v_g=\partial\omega/\partial k$. At $\omega$, k various hybrids can be formed called polaritons.

Optical Buffers

An optical buffer (OB) is one of the key components in photonics, such as a fiber loop. An optical buffer is used to time delay the optical pulse information in a communication signal and computation processing system so it can be read. The purpose of an optical buffer is to store and then release the data in optical format with the needed conversion into electrical format. Using an optical buffer, one can slow down optical data and/or store it.

One practical optical buffer is a fiber loop. The optical data is delayed in a fiber loop. For example, the optical data may be needed for a time of length of bit information (e.g. 1000 bits at a rate of 10 gigbits/s). Therefore the optical fiber loop needed is about 33 meter long ($10^{-10}$ s/bit×1000 bit=$10^{-7}$ s=3.3 ns/m×30 m). For most applications this is too long of a fiber to be pragmatic. To reduce the length of the optical buffer fiber to the centimeter scale and keep the delay time of $10^{-7}$ s one needs to reduce the group velocity $v_g \rightarrow 0$. To this end the disclosed Bessel beam $\omega$ near $\omega_c$ is used.

Antenna

Referring to FIGS. 3A to 3G, the dipole emission into available states from each atomic or molecular center, such as quantum dot, is changed due to antenna and cavities as evident in its dispersion $\omega$ vs k characteristics and special designed optical antennas. The special function beams B, LG and G are trapped in these antenna to maximize the interaction by the Purcell factor. FIGS. 3A to 3G show different antenna or cavity structures with an emitting dipole $\vec{\rho}$. The dipole emission $\vec{\rho}$ can be altered by the different antenna and cavity structures, which change the available modes and density of states of light. Structural light dispersion from waveguides, rectangular waveguides, 1D/2D fibers, and 2D/3D gratings allow for subluminal and enhanced emission/absorption/reflection as well as propagation and generation of light. In one embodiment, the beam is an LG beam with a Rayleigh zone $2z_0$.

Figure 3A:
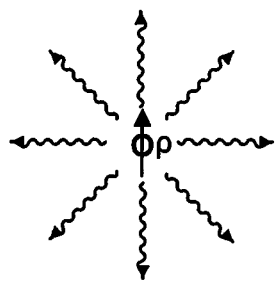
FIGS. 3A to 3F depict various dipoles (e.g. quantum dots, dyes, molecules, atoms) in different structures where the density of states resonance modes are changed from free space.
Figure 3B:
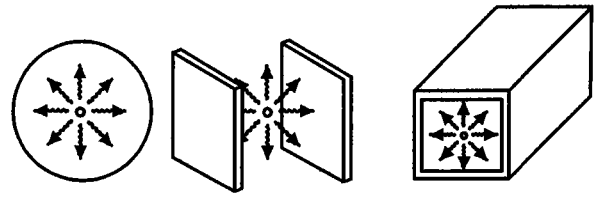
Figure 3C:
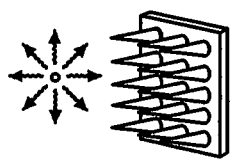
Figure 3D:
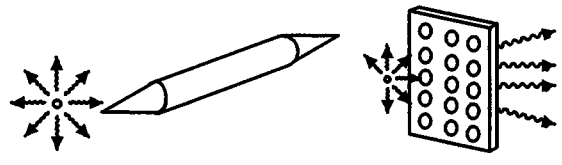
Figure 3E:
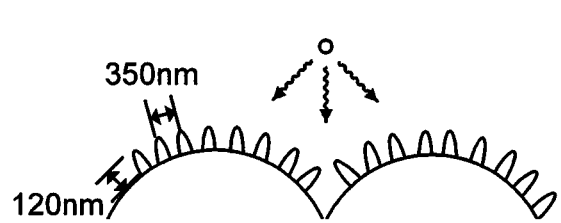
Figure 3F:
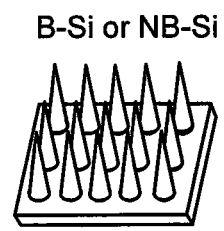

FIG. 3A depicts omnidirectional light producing an emitting dipole $\vec{\rho}$ without an antenna. FIG. 3B shows an antenna that provides a cavity to shape the emitting dipole $\vec{\rho}$. The antenna of FIG. 3B is an elongated box formed by at least four walls. FIG. 3C depicts a surface of an antenna that comprises a plurality of grating cones. The cones have a predetermined size and are spaced from one another at a predetermined pitch. FIG. 3D depicts a quantum dot and a nanoantenna. The length of the nanoantenna is 50% the wavelength of light. FIG. 3E depicts a fly eye antenna comprising multiple curved surfaces, each with a plurality of elongated protections. In the embodiment of FIG. 3E each protection is 120 nm long and spaced from one another with a pitch of 350 nm. The curved surface has a depth of curvature of 9 $\mu m$ and a diameter of 21 $\mu m$. FIG. 3F depicts Black silicon cones on top of a plate to form a nano cone grating.

This disclosure provides a method of creating Bessel beams using spatial light modulator (SLM), superposition of Bessel beams Jo, J1, J2 . . . , SC Bessel beams (400 nm to 900 nm). The $v_g$ can be measured using a streak camera at different $\omega$ (e.g. from 400 nm to 900 nm) of SC Bessel beam focused to $\frac{1}{2}$ to 10 $\mu m$ spot size.

Waveguides Dispersion for Slow Light

Similar effects of slowing can be achieved in structures such as waveguides and even its own beam size for Bessel, LG, and Gaussian beams obey dispersion curves of available modes in spatial structure. For any waveguides in xyz, the beam is confined in x and y direction and travels in z direction. The momentum dispersion equation is:

$$k^2=k_x^2+k_y^2+k_z^2 \quad (25)$$

where $k_i=n_i\omega/c(i=x, y, z)$

The confinement in x and y directions in a waveguide (see FIG. 3D) of size d gives standing waves of wavelength $d=\Delta/2$ such as $$k = \frac{2\pi}{\lambda} = \frac{\pi}{d},$$

$kd=\pi$. Therefore for standing waves in a waveguide of size a and b $kd=k_x a=m\pi$ and $kd=k_y a=n\pi$ where m and n are mode numbers for the light states. The confinement on x and y from equation 18 and 19 and 20 gives:

$$k_z^2 = \frac{n^2\omega^2}{c^2} - \left(\frac{m\pi}{a}\right)^2 + \left(\frac{n\pi}{a}\right)^2 \quad (26)$$

The cutoff frequency, when $\omega=\omega_c$ $k_z=0$ (propagation is frozen, $v_g=0$) causes a natural gap where $v_g \rightarrow 0$ as $\omega \rightarrow \omega_c$.

The $k_z$ for waveguides is:

$$k_z = \sqrt{\frac{n^2\omega^2}{c^2} - \left(\left(\frac{m\pi}{a}\right)^2 + \left(\frac{n\pi}{b}\right)^2\right)} \quad (27)$$

The inverse group velocity is $$v_g^{-1} = \frac{\partial k_z}{\partial \omega} = \left(\frac{\omega n^2}{c^2}\right)\left(\frac{\omega n^2}{c^2} - \left(\frac{m\pi}{a}\right)^2 + \left(\frac{n\pi}{a}\right)^2\right)^{\frac{1}{2}} \quad (28)$$

The group velocity in waveguide is $$v_g = \frac{c}{n}\left(1 - \frac{c^2}{\omega^2 n^2}\right)\left(\left(\frac{m\pi}{a}\right)^2 + \left(\frac{n\pi}{a}\right)^2\right)^{\frac{1}{2}} \quad (29)$$

where $$v_g = \frac{c}{n}\left(1 - \frac{\omega_c^2}{\omega^2}\right)^{\frac{1}{2}}; \omega_c = \frac{c}{n}\sqrt{\left(\frac{m\pi}{a}\right)^2 + \left(\frac{n\pi}{a}\right)^2} \quad (30)$$

with modes m, n=0, 1, 2, . . .

$$v_g(\omega) = \frac{c}{n}\left(1 - \frac{\omega_c^2}{\omega^2}\right)^{\frac{1}{2}} \equiv \frac{c}{n_g} \quad (31)$$

Enhancement of Optical Properties of Absorption and Emission in Structures with Structured Light The key behind transitions in materials in energy states of dipoles is governed by Fermi's golden rule. The spontaneous transition emission rate depends on multi-pole transitions between final $|f\rangle$ and initial $|i\rangle$ states.

$$K_{i \to f} = 2\pi |\langle i|H_{int}|f\rangle|^2 \rho(\omega) \quad (32)$$

where transition matrix $M_{if} = \langle i|H_{int}|f\rangle$, $H_{int-}$ interaction Hamiltonian, and $\rho(\omega)$ is density of available states.

The vector potential $\vec{A}$ of light has transverse spatial profiles of planar-Gaussian (G) and nonplanar twisted wavefronts, such as Laguerre-Gaussian (LG) and Bessel (B) alters the transition strength and OAM allowed L and S transitions. The latter two LG and B are structured light beams, which are nonplanar twisted wave fronts which carry orbital angular momentum (OAM).

The equations denoting the structured light's vector potential $\vec{A}$ of LG and B beams for the transition matrix M are:

$$\vec{A}_{LG}(\rho, \theta, z) = \hat{\varepsilon} A_0 e^{\frac{\rho^2}{\omega^2}} L_p^l\left(\frac{2\rho^2}{\omega^2}\right) e^{il\theta} e^{i(kz-\omega t)} \quad (33)$$

and $$\vec{A}_B(\rho, \theta, z) = \hat{\varepsilon} A_0 J_l(k_\rho \rho) e^{il\theta} e^{\varepsilon(kz-\omega t)} \quad (34)$$

where $J_1$-Bessel and $L_p^l$-Laguerre polynomal of order p angular order 1. The disclosed structured light alters the transition matrix for optical properties.

These $\vec{A}$ beams given by LG equations 33 and 34 alter the optical transition strength $(M)^2$ and selection rules for $\Delta l$ and $\Delta m$ quantum number for states $\langle i|$ and $|f\rangle$ and with angular polarization of different spin $\pm \sigma$ states. The use of LG, $\Delta l=l\pm 1$, while for standard G, $\Delta l=\pm 1$.

For absorption/emission where $H_{int}$ is an interaction such as $\vec{p}\cdot\vec{A}$ or dipole momentum $\vec{d}=q\vec{r}\to\vec{rE}$. The keys are $\rho(\omega)$ the density of final states $\vec{p}\cdot\vec{A}$. For free space:

$$\rho(\omega) = (\omega^2/\pi^2 c^3)V \quad (35)$$

For free space for two energy levels $E_1$ and $E_2$ the $K_{12}$ is:

$$K_{12} = \frac{4}{3}\left(\frac{1}{4\pi\varepsilon_0}\right)p^2\left(\frac{1}{\hbar}\right)\frac{\omega_0^3}{c^3} = \left(\frac{1}{3\varepsilon_0}\right)p^2\left(\frac{w_0}{\hbar}\right)\frac{\pi}{c^3}\rho(\omega) \quad (36)$$

For dipole $\rho, \omega_0 = (E_1 - E_2)/\hbar$.

The spontaneous emission rate in a cavity is enhanced for free space by the relationship:

$$k_{cavity} = \frac{3}{4\pi^2}\frac{\lambda^3}{V}Qk \text{ (free space)} \quad (37)$$

where $$\frac{3}{4\pi^2}\frac{\lambda^3}{V}Q = F_p$$

is the Purcell factor.

The Purcell factor $F_p$ enhances the spontaneous emission and absorption rates for large Q small volume and large $\lambda$. The resonance modes for a dipole depends on different structures can lead to larger absorption and emission.

For $\vec{p}\cdot\vec{A}$ term in transition matrix element, the vector potential $\vec{A}$ is usually a plane wave (Gaussian) which causes selection rules ($\Delta l=\pm 1$) for transitions and strength of interaction using structured light when $\vec{A}$ is nonplanar wave with helicoidal "twisting" wave front, it introduces extra azimuthal phase $e^{il\phi}$ and radial $\rho$ dependence of Laguene-Gaussian (LG) or Bessel beams. Therefore, structured light (LG) A has an extra term $\rho^l$ and $e^{il\phi}$ which changes matrix element $\langle i|\vec{p}\cdot\vec{A}|f\rangle$ values in strength and selection rules $\Delta l=l+1$ for materials i.e. QDs, QWs, semiconductors and organics for changes in spin polarization and non-allowed dipole transitions for LG and Bessel beams, for example in non-dipole n=1 absorption transitions in $Cu_2O$ at 607 nm.

The absorption and reflection of light can be changed by nm and μm structures. The fly eye is an example to change the available modes to decrease the reflection by 7 fold acting like an AR coating (See FIG. 3E).

Nano and μm cones on silicon (called black silicon) produced by femtosecond laser ablation with chemical etching can lead to a change in absorption, making it absorb more light and extend the absorption into MR for both solar collectors and solar cells. The absorption in black silicon is enhanced and reflection is reduced.

Structured surface like nm and μm cones up top of solar cells and silicon or addition of strips and tips alters the absorption by changing the resonance modes. The absorption enhancement by increasing the number of modes is $F=3.14n$ for 1D grating and $F=8n^2$ for 2D grating.

For black silicon n=3.4 with nano and micro cones 2D array F=93× increase in absorption.

Figure 5:
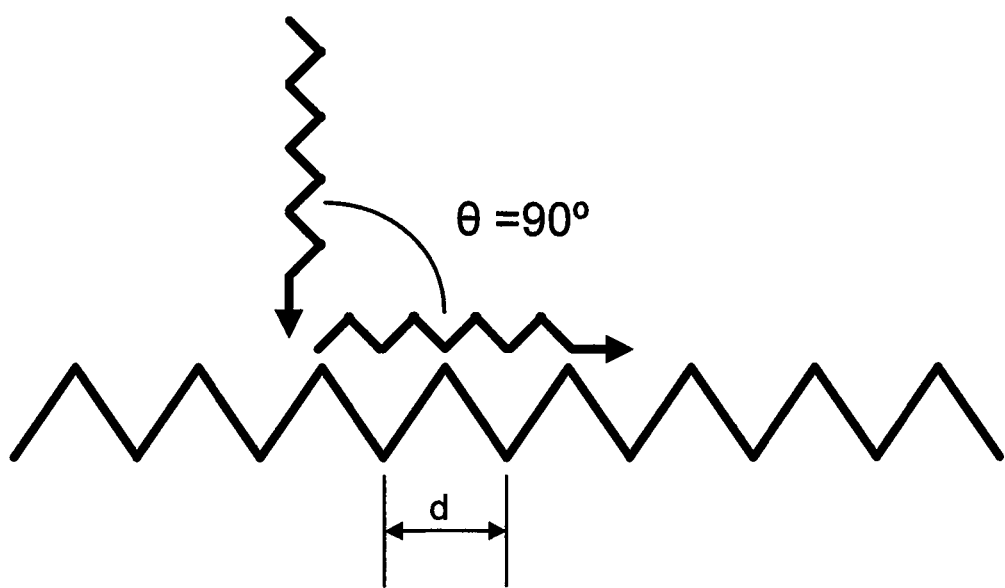
FIG. 5 is a schematic depiction of diffraction of a 2D structure grating, such as black silicon.

This enhancement will increase absorption in Si at $\lambda > 1000$ nm to 1500 nm for better energy collection in solar cells via photo conduction. FIG. 5 shows diffraction of 2D grating for theta=90 giving larger path lengths.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for producing subluminal light, the method comprising steps of:
   generating a nonplanar optical beam having an angular frequency ($\omega$) and a constant beam diameter($\alpha$) between 0.1 µm and 10 µm;
   propagating the nonplanar optical beam through a free-space air medium, the free-space air medium having an index of refraction ($\eta$), wherein the angular frequency ($\omega$) of the nonplanar optical beam is within 25% of a critical angular frequency ($\omega_c$) given by $$\omega_c \equiv \frac{ck_\perp}{n}$$

wherein $k_\perp$ is a transverse wavenumber given by $$k_\perp = \frac{2\pi}{a}.$$

2. The method as recited in claim 1, wherein the nonplanar optical beam is a Bessel beam.

3. The method as recited in claim 1, wherein the nonplanar optical beam is a Laguerre Gaussian beam.

4. The method as recited in claim 1, wherein the index of refraction ($\eta$) is 1.

5. The method as recited in claim 1, wherein the step of propagating confines the nonplanar optical beam in X and Y directions but permits propagation in a Z direction, thereby providing a waveguide.

6. The method as recited in claim 1, wherein the waveguide is a rectangular waveguide.

7. The method as recited in claim 6, wherein the nonplanar optical beam is slowed in the Z direction.

8. The method as recited in claim 6, wherein the nonplanar optical beam is a Laguerre Gaussian with a Rayleigh zone $2z_0$.

9. The method as recited in claim 1, further comprising exposing an antenna to the nonplanar optical beam after the step of propagating.

10. The method as recited in claim 9, wherein the antenna comprises a plurality of cavities, each cavity having a volume of less than 5 µm$^3$.

11. The method as recited in claim 9, wherein the antenna provides a plurality of cavities, each cavity having a volume between 0.5 and 3 µm$^3$.

12. The method as recited in claim 9, wherein the antenna is selected from the group consisting of an elongated box antenna, an antenna with a plurality of grating cones disposed on a planar surface; a nanoantenna, a fly eye antenna and a black silicon antenna.

13. The method as recited in claim 2, wherein the Bessel beam forms a natural waveguide in the free space air medium to reduce a speed of the nonplanar optical beam.

14. The method as recited in claim 3, wherein the Laguerre Gaussian beam forms a natural waveguide in the free space air medium to reduce a speed of the nonplanar optical beam.

* * * * *